United States Patent [19]
Smith

[11] Patent Number: 5,777,771
[45] Date of Patent: Jul. 7, 1998

[54] GENERATION OF OPTICAL SIGNALS WITH RF COMPONENTS

[75] Inventor: Ian Christopher Smith, Ipswich, United Kingdom

[73] Assignee: British Telecommunications PLC, London, England

[21] Appl. No.: 530,158

[22] PCT Filed: Mar. 30, 1994

[86] PCT No.: PCT/GB94/00675

§ 371 Date: Jan. 16, 1996

§ 102(e) Date: Jan. 16, 1996

[87] PCT Pub. No.: WO94/23507

PCT Pub. Date: Oct. 13, 1994

[30] Foreign Application Priority Data

Mar. 31, 1993 [GB] United Kingdom ............... 93302537
Mar. 31, 1993 [GB] United Kingdom ............... 93302540

[51] Int. Cl.$^6$ ........................................ H04B 10/04
[52] U.S. Cl. ...................... 359/180; 359/162; 359/177
[58] Field of Search ................................ 359/160, 162, 359/177, 180, 182, 188, 191, 194, 161

[56] References Cited

U.S. PATENT DOCUMENTS

| | | | |
|---|---|---|---|
| 5,107,358 | 4/1992 | Hodgkinson et al. | 359/173 |
| 5,166,821 | 11/1992 | Huber | 359/173 |
| 5,227,908 | 7/1993 | Henmi | 359/173 |
| 5,315,426 | 5/1994 | Aoki | 359/162 |
| 5,359,450 | 10/1994 | Ramachandran et al. | 359/173 |
| 5,379,309 | 1/1995 | Logan, Jr. | 372/18 |
| 5,473,457 | 12/1995 | Ono | 359/161 |

OTHER PUBLICATIONS

Weik, Communications Standard Dictionary, p. 1008, definition of "up converter", 1983.

O'Reilly et al "Optical Generation of Very Narrow Linewidth Millimetre Wave Signals", Electronics Letters, 3rd Dec. 1992, 28, pp. 327–328.

Polifko et al, "Millimeter–Wave Optical Transmission with Combination Narrowband EOM and Laser Modulation", Fourth Optoelectronics Conference (OEC '92) Technical Digest, Jul. 1992, pp. 250–251.

Primary Examiner—Leslie Pascal
Attorney, Agent, or Firm—Nixon & Vanderhye, PC

[57] ABSTRACT

An optical beam having a high radio-frequency modulation is generated by generating a lower frequency modulation, using it to control the optical output of a laser and further modulating the optical output in an optical modulator by a control signal having another lower frequency modulation generated. Either or both of the lower frequency modulations also carries an information containing modulation, the effect of the optical modulator is to up-convert the modulation carried by the optical beam by the modulation frequency of the control signal. The optical modulator may be a Mach-Zehnder interferometer. The non-linearity of such a modulator with respect to its control input may be exploited by selecting the amplitude of the control signal such that the optical output is up-converted by an integer multiple of the initial modulation frequency. These methods avoid the need to apply the high frequency modulation to either the laser input or the control input directly.

26 Claims, 5 Drawing Sheets

--- ELECTRICAL INPUT —— OPTICAL OUTPUT

--- ELECTRICAL INPUT    —— OPTICAL OUTPUT

GENERATION OF OPTICAL SIGNALS WITH RF COMPONENTS

BACKGROUND OF THE INVENTION

1. Field of the Invention

The present invention relates to a method of generating signals having optical carriers. It finds particular application in the generation of radio frequency (RF) modulations to be carried over optical media.

2. Related Art

The principle of modulating an optical beam by an information content is well established, and various methods are known of achieving this. Some arrangements involve controlling the light source (typically a laser) by varying its input bias voltage. Other arrangements use optical devices in the path of the generated beam (typically on an optical fibre) to interrupt the beam. A known optical device for this purpose is the Mach-Zehnder interferometer. The principle of this device is to split the optical beam into two paths, one or both of which passes through a medium wh refractive index varies as a function of the electric potential applied to it. By applying an electrical signal one or both paths, the difference between the path lengths of the two beam paths can be varied, such that the re-combined beams interfere constructively or destructively depending on the electrical fields applied. The intensity of the recombined beam therefore varies in response to the varying electrical input signal.

It is known for the modulation carried by an optical signal to include a carrier frequency in the radio frequency (RF) range. This principle, known as 'Radio by Fibre,' allows a radio signal, including its RF carrier, to be generated at one location and transmitted over the air from another, remote, location. The signal is typically carried by an optical fibre between these locations. This allows the equipment at the point from which the signal is to be transmitted over the air to be kept very simple. In its simplest form it need consist only of a detector to convert the optical input into an electrical signal, and an antenna for transmitting the electrical signal over the air. This is particularly useful in situations where an antenna has to be located at a point difficult of access, such as a hilltop, because the complex equipment required to generate the radio frequency carrier in particular the local oscillator can be located at another more accessible location. Moreover, it is possible to achieve economies in a branched network, in which one signal is transmitted to several antenna sites, because only one local oscillator is required to generate the carrier to be transmitted by all the antennas.

The detectors for these arrangements are typically photodetectors. These produce an electrical output which varies with the intensity of incident light. This electrical output therefore corresponds to the modulation, but without the optical carrier frequency.

Known optical systems suffer from a number of practical limitations, in particular in the accurate transmission of high radio frequencies (of the order of a few tens of GHz). As frequencies approach the millimeter waveband (tens of gigahertz) it becomes increasingly difficult to achieve direct modulation of the laser by applying a signal to the input bias voltage, because of inherent physical limitations of the laser devices themselves. Similar constraints apply to modulation devices such as the Mach-Zehnder interferometers discussed above, as the high frequencies necessitate very small dimensions which impose constraints which reduce their efficiency. Velocity matching between the electrical and optical signals also becomes harder to achieve and maintain.

There is an additional problem with the application of signals by means of a Mach-Zehnder optical modulator. As explained above, the principle of these modulators is that as the voltage applied to the electrical input of a Mach-Zehnder interferometer is increased, the difference in optical path length increases. This results in the two optical paths passing in and out of phase, so that the amount of light passing through the interferometer varies as a periodic function of the applied voltage, and not as a linear function. This non-linear response to the input means that only constant-amplitude signals would be accurately reproduced.

A proposal by O'Reilly and Lane (Electronics letters, Vol 28, No 25, page 2309) addresses the first of these problems. In this proposal, an electrical signal having a frequency $\omega$ in the RF band is applied to the control input of an optical modulator. This modulator is biassed such that the optical output generated is modulated by a signal dominated by two side bands centred on the optical carrier frequency of the original optical signal fed into the modulator and each spaced from the optical carrier frequency by the frequency of the electrical signal $\omega$. These side bands produce sum and difference beats at an optical receiver such as a photodector. The 'sum' beat is at twice the optical carrier frequency. The 'difference' beat is at frequency $2\omega$ which is in the RF band. A photoelectric receiver would not be sensitive to the optical-frequency 'sum' beat, but would generate an electrical signal at the 'difference' frequency. This proposal therefore produces an output signal carried by the optical beam which is at twice the frequency of the electrical signal applied to the control input.

O'Reilly and Lane further propose applying an information-containing modulation to this output signal by separating the two side bands using optical filters, modulating one of them with the information content using a second optical modulator, and re-combining them, to generate an output having an optical carrier, modulated by a second, radio frequency, carrier $2\omega$, and further modulated by the information content. However, this further optical modulation suffers from the non-linearity discussed above, and requires the use of optical filters and a second optical modulator which result in optical losses.

SUMMARY OF THE INVENTION

According to a first aspect of the invention there is provided a method of generating a modulated optical signal having a first RF component including a first RF carrier frequency and an information component, the method comprising the following steps:

i) Generating a first optical signal having a second RF component including a second RF carrier frequency different from said first RF carrier frequency;

ii) Generating a control signal having a third RF component including a third RF carrier frequency different from said first RF carrier frequency;

said second or said third RF component including the information content;

iii) applying the first optical signal to an optical modulator and iv) applying the control signal to the optical modulator to modulate the first optical signal so as to produce an output optical signal modulated by said first RF carrier frequency and said information component, said first carrier frequency being said second carrier frequency upconverted by said third carrier frequency or by an integer multiple of said third carrier frequency.

The invention has a number of advantages over the prior art. By applying RF components to both inputs of the modulator, an upconversion is achieved. This allows a higher frequency to be generated at the output of the modulator than is applied to either of the inputs. The use of lower RF frequencies in the optical input allows a simpler laser to be used to generate the desired RF signal. The use of lower RF frequencies at the control input of the modulator similarly allows greater flexibility and simplicity in the design of the modulator, which is constrained by the input frequency and not the output frequency.

Either the first optical signal or the control signal may include the information component. The invention also extends to a method of encryption comprising the steps of the first aspect wherein both the input optical signal and the control signal include an information component, one of which is a predetermined encryption code, and to a method of de-encrypting a signal generated in this way, comprising applying to the output signal a further modulation complementary to that of the predetermined encryption code. This provides a simple way of upconverting and encrypting a signal in one operation.

In a preferred embodiment the control signal is an electrical signal, the modulator being of the tape where the optical output of the modulator has a non-linear response to the electrical control input. A Mach-Zehnder interferometer is an example of such a modulator. Using a modulator of this type the first RF carrier frequency may simply be a sum of the second and third RF carrier frequencies (i.e the third RF carrier frequency upconverts the second RF carrier frequency to the first RF carrier frequency). However in this type modulator the amplitude of the control signal may be select such that the second RF component is upconverted by frequency which is a desired integer multiple of the third component. This allows even larger conversion factors to created between the control frequency and the output frequency, with consequent lower frequency control signals further mitigating the design constraints on the modulator.

The modulation carried by the first optical signal is preferably generated by controlling the bias voltage of a laser.

The invention also extends to an optical signal generated according to the method of the invention, and a radio or electrical signal generated by detecting such an optical signal.

According to a second aspect the invention comprises apparatus for generating an optical signal having a first RF component which includes a first RF carrier frequency and an information component, comprising:
i) an optical modulator having an optical input, an optical output, and a control input;
ii) means for supplying to the optical input a modulated optical signal having a second RF component including a second RF carrier frequency different from said first RF carrier frequency;
iii) means for supplying to the control input a control signal having a third RF component including a third RF carrier frequency different from said first RF carrier frequency,
iv) means for applying a modulation comprising said information component to said optical signal or said control input;

the arrangement being such that there is produced at the optical output an optical signal modulated by said first RF carrier frequency and said information component, said first carrier frequency being said second carrier frequency upconverted by said third carrier frequency or by an integer multiple of said third carrier frequency.

In a preferred embodiment the control input is an electrical input and the optical modulator is a Mach-Zehnder interferometer. The means for generating the control signal may be arranged to generate a signal of sufficient amplitude that the second RF component is upconverted by a frequency which is an integer multiple of the third RF component.

The means for supplying the optical signal is preferably a laser. Preferably means for controlling the bias voltage of the laser are provided for generating the second RF component.

The input optical signal therefore carries an initial RF modulation, so that the output optical signal comprises an RF modulation which is the initial RF modulation upconverted by the control RF frequency. This allows the use of control frequencies lower than the desired output RF carrier frequency. Moreover, if a modulator having a non-linear transfer function is used, such as a Mach-Zehnder interferometer (whose transfer function is periodic) even larger upconversion factors can be used because by selection of the amplitude of the control signal appropriately, the output can be dominated by a harmonic of the control signal. To understand why this occurs, consider a control signal having a amplitude $V_{2\pi}$ causing the difference in path lengths in the optical paths to vary between zero and one wavelength $\lambda$. (See FIG. 2). On each cycle of the control signal the path length difference will thus vary from zero to $\lambda$ and back again. There will thus be two points of constructive interference (at zero and $V_{2\pi}$) and two points of destructive interference (at $V_\pi$) for each cycle of the control signal, so that the signal applied by the modulator to the optical signal is in this case twice the control signal frequency. By selecting other amplitudes for the control signal different integer multiplication factors can be introduced. In the simple example above the amplitude of the control signal is chosen to vary the path length by a whole number of wavelengths. Varying it over smaller amplitudes can also generate signals having dominant harmonics which may be used in the same way.

The invention also extends to an encryption device comprising the elements of the second aspect of the invention wherein means are provided for applying a modulation comprising an encryption code to the optical input or the control input.

Information content may be applied to either input signal. In modulators such as Mach-Zehnder interferometers having the non-linearity referred to above, large amplitude modulations of the control input would not be accurately reproduced in the output optical signal. However amplitude modulations applied to the optical input do have a linear response. The Mach-Zehnder interferometer used as the modulator of the preferred arrangement also has a linear response to phase and frequency modulations applied to either the control or the optical input. Combinations, such as phase-amplitude modulation (e.g quadrature amplitude modulation: QAM) are also possible in the optical input.

According to a third aspect of the invention, there is provided a method of generating an output optical signal having an RF modulation comprising applying an input optical signal to an optical input of a modulator having a non-linear transfer function, applying a control signal having a control RF frequency to a control input of the modulator, the amplitude of the control signal being such that the output optical signal is modulated by an RF frequency which is an integer multiple of the control RF frequency. The modulator is preferably a Mach-Zehnder interferometer. This aspect of the invention allows high RF frequency modulations to be applied to the optical signal although a lower frequency is applied to the control input. This has the advantages discussed above in mitigating design constraints on the optical modulator.

BRIEF DESCRIPTION OF THE DRAWINGS

The invention will now be further described by way of example only with reference to the accompanying drawings in which.

DETAILED DESCRIPTION OF EXEMPLARY EMBODIMENTS

Figure 1:
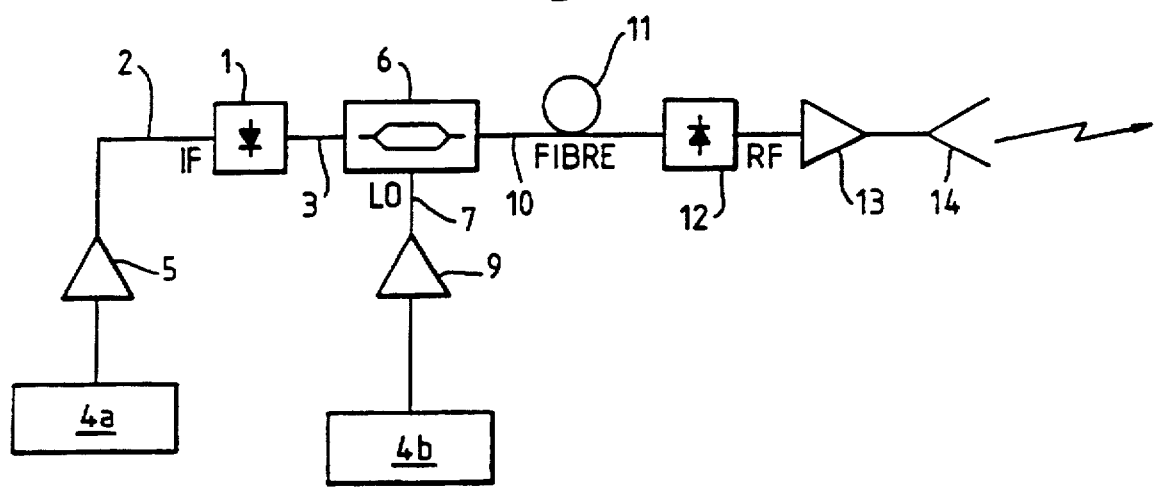
FIG. 1 is a diagrammatic representation of an arrangement for performing the method of the invention.

Referring to FIG. 1, there is shown an arrangement including a laser 1 having an electrical power input 2, and an optical output 3. A source 4a of an RF electrical signal is connected to the electrical input 2 through amplifier 5. Connected to the optical output 3 of laser 1 is a Mach-Zehnder optical modulator 6. The electrical input 7 of the modulator 6 is fed another RF signal from source 4b through a power amplifier 9. The output 10 of the modulator 6 is connected, through optical fibre 11 to a photodetector 12 which converts the optical signal to an electrical signal. The photodetector is coupled through another amplifier 13 to a radio antenna 14 which converts the electrical signal to a radio signal. The RF electrical signals from either of source 4a or source 4b may include a modulation carrying the required information content. Signal source 4a may generate analogue or digital modulation outputs which may themselves be modulated onto RF carrier frequencies. Signal source 4a may generate a multichannel output using any suitable modulation scheme such as frequency modulation, amplitude modulation, or phase modulation. Because of the non-linearity of the modulator, source 4b can only supply one channel at a time. This channel may be frequency or phase modulated.

Several ways in which this arrangement may be used will now be described.

In a first method the signal source 4a generates an electrical FM carrier in the gigahertz range suited to the response time of the laser 1. The FM electrical carrier signal carries a modulation in the megahertz band, provides the input to the laser 1, the optical signal generated by the laser 1 varying directly in response to the electrical input signal to provide a modulated FM optical signal at output 3.

In order to up-convert the optical signal modulated an intermediate frequency (IF) to a higher frequency optical signal is mixed in modulator 6 with a loca oscillator frequency LO from source 4b. The output of modulator 6 is thus a signal comprising an optical carrier, modulated by a high frequency RF signal being the RF carrier frequency (IF) from source 4a plus the local oscillator frequency of source 4b, itself modulated by the information content. Upconversion therefore takes place within the optical system, and this has a number of advantages over performing it in the electrical systems upstream or downstream of the optical system. In a second arrangement, the information bearing modulation may be applied through signal source 4b. This can be phase or frequency modulated and has an RF carrier frequency.

By supplying the signal from source 4b at a sufficiently large amplitude the RF frequency may be multiplied in the modulator 6 in a manner to be described below, allowing the output of the modulator to be at a higher frequency than the electrical input, thereby avoiding the problems associated with optical modulators when driven at such high electrical frequencies.

Other arrangements can be devised which are within the scope of this invention. For example, information-bearing signals may be applied by both sources 4a and 4b, that at source 4b being a predetermined code. The two signals will become scrambled in output 10. A remote user, knowing the code signal applied at 4b may receive the scrambled signal over the air from antenna 14, and re-combine the output signal by a signal complementary to that from source 4b, to recover the signal from input 4a.

The use of the modulator as a multiplier of the local oscillator frequency, in addition to its function as a mixer of the local oscillator and optical modulation signals, will now be described.

Figure 2:
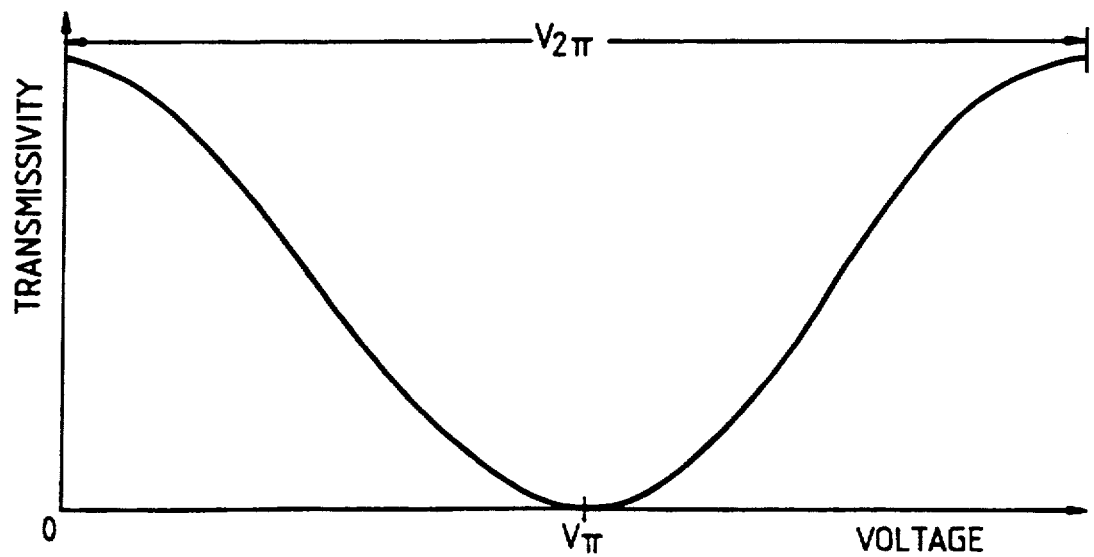
FIG. 2 is a diagram showing the variation of transmissivity of a Mach-Zehnder modulator to changes in applied voltage.
Figure 3:
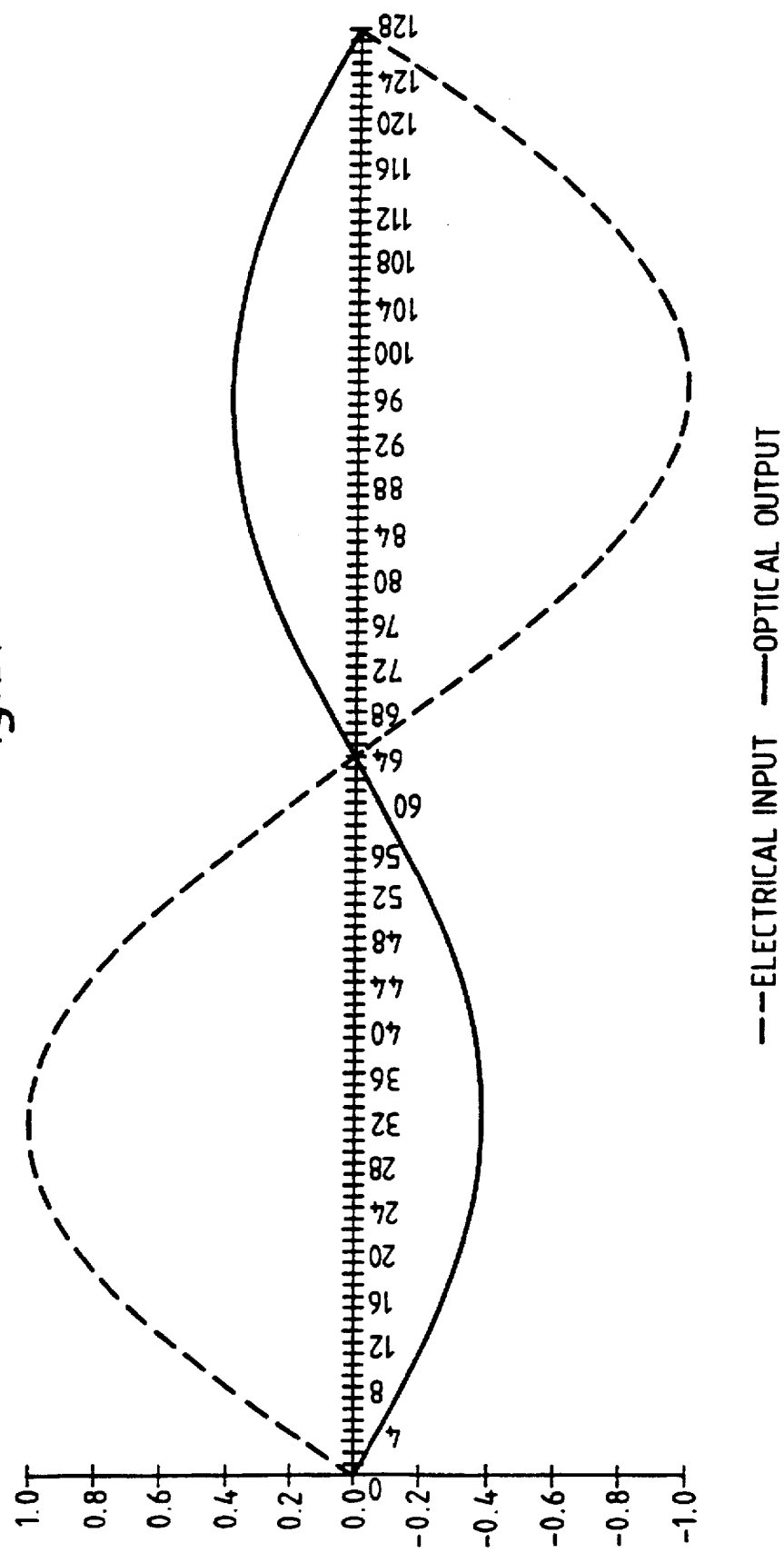
FIGS. 3 to 6 are diagrams showing the way in which the frequency multiplication factor changes with the amplitude of the voltage applied to a Mach-Zehnder modulator.
Figure 4:
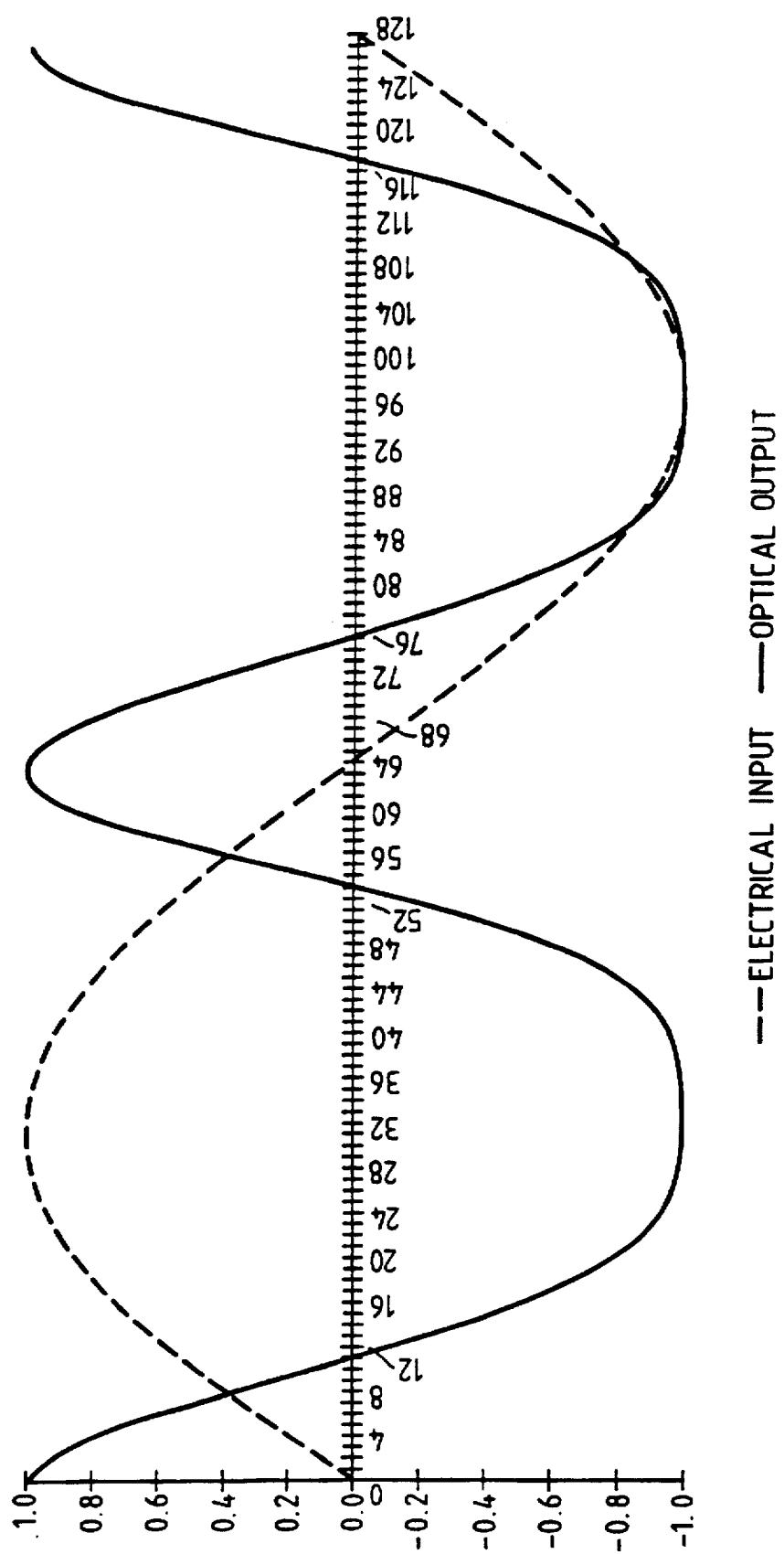
Figure 5:
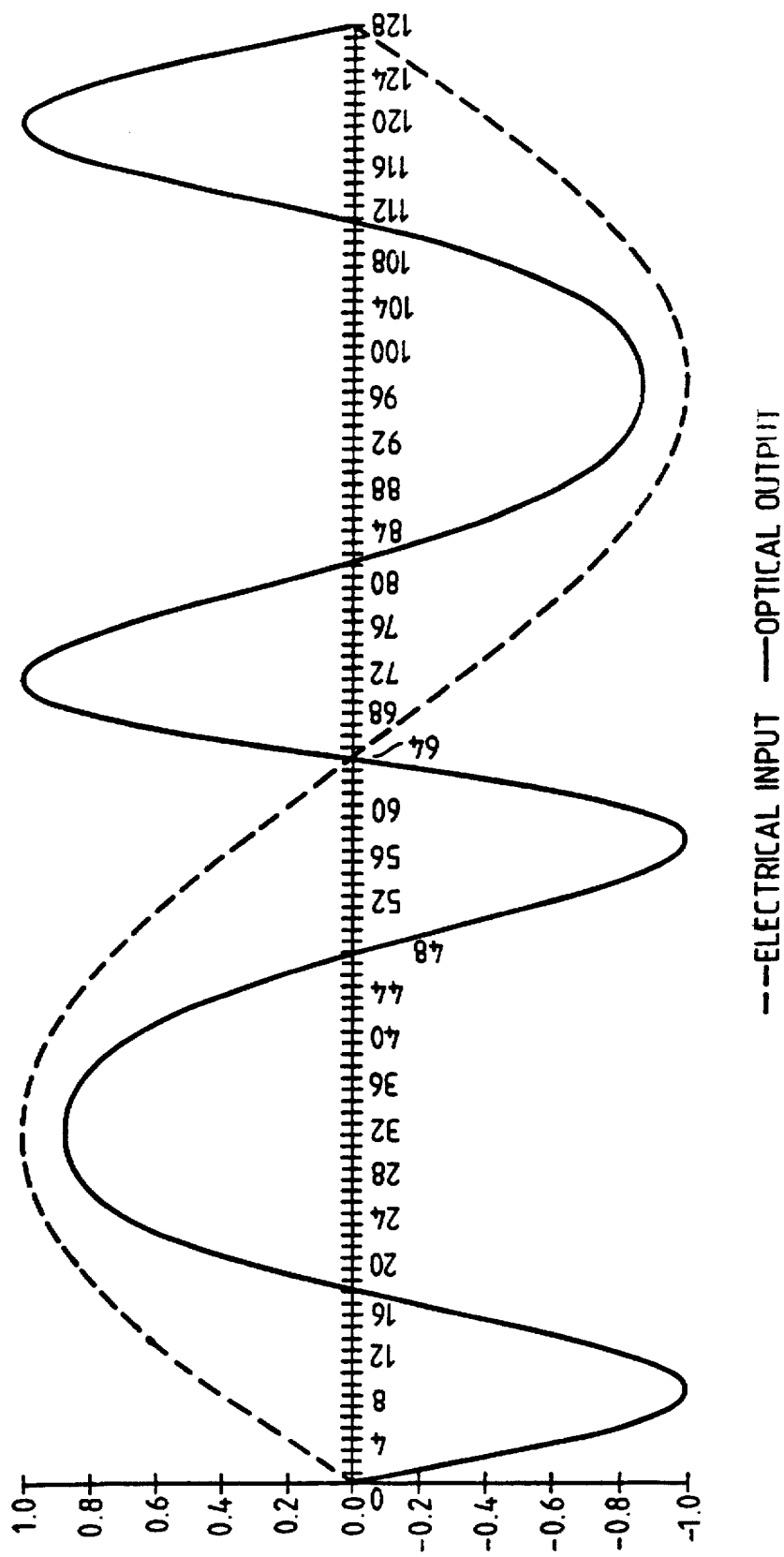
Figure 6:
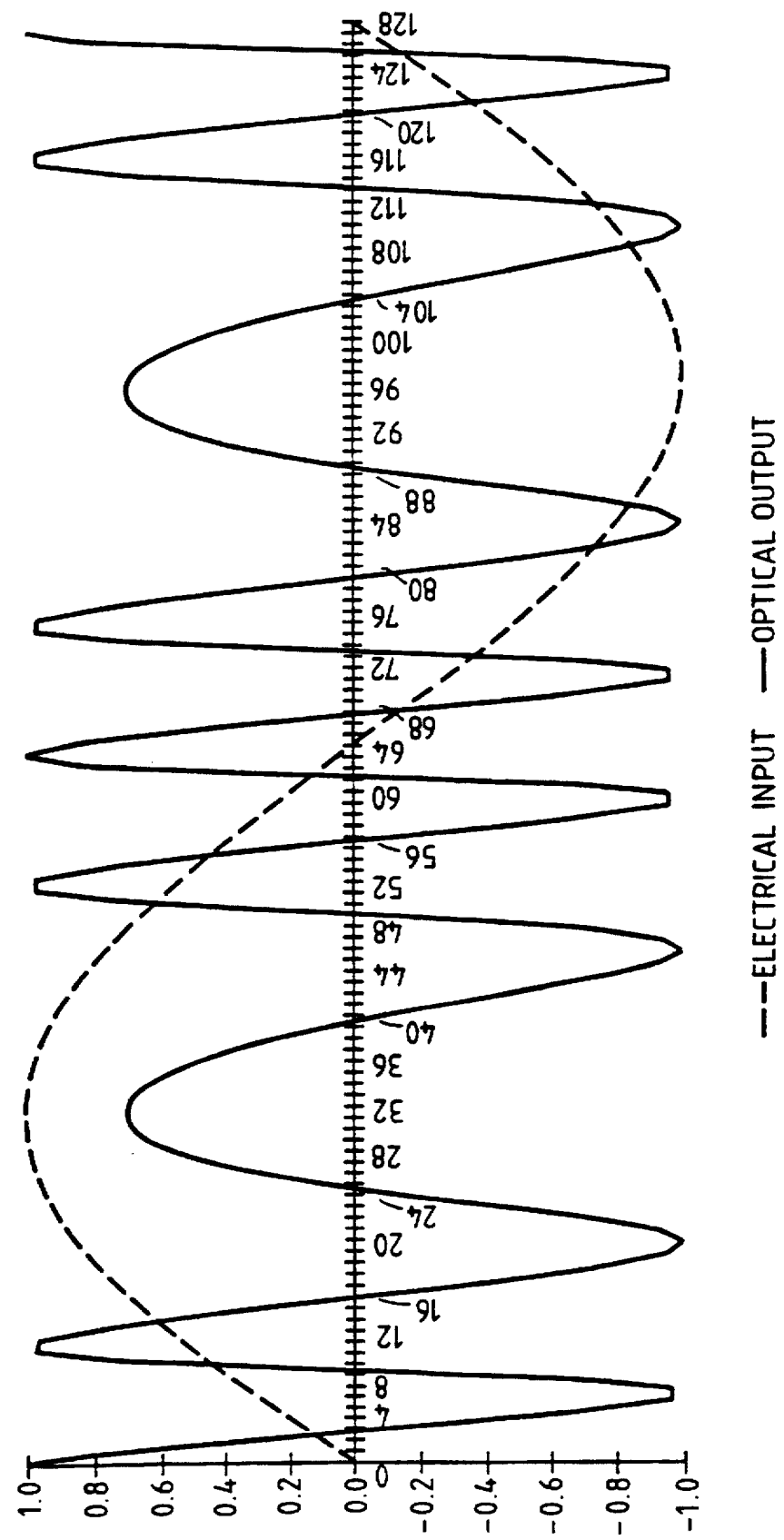

In FIG. 2 the horizontal axis shows the voltage applied to the modulator and the vertical axis shows the transmissivity of the modulator. It will be seen that the response of the modulator is highly non-linear with respect to variations in electrical input. It is therefore most suited for provision of a constant amplitude modulation. More complex modulations will be distorted by the non-linear response. In arrangements in which the modulated input 4 is fed to the electrical input 7 of the optical modulator 6, this non-linear response limits use of the system to single channel applications.

In the arrangement according to the present invention, the non-linear response of the modulator can be used to generate harmonics of the local oscillator frequency, thus allowing higher upconversion factors in the modulator.

The output i(t) of the photodector 12 can be expressed as a sum of its Fourier components $I_p$:

$$i(t) = \sum_{p=-\infty}^{\infty} I_p \exp(jp\omega t)$$

$$I_p = \frac{1}{\tau} \int_{-\frac{\tau}{2}}^{\frac{\tau}{2}} i(t)\exp(-jp\omega t)dt$$

Assume a Mach-Zehnder modulator with a characteristic symmetrical about V=0 (FIG. 2), with $V_\pi$ being the voltage excursion required for the transmissivity of the Mach-Zehnder interferometer to go from full transmission (constructive interference) to full extinction (destructive interference).

Applying a sinusoidal voltage ($V_a$ sin $\omega t + V_b$) to an interferometer where:

$V_a$=amplitude of applied voltage $V_b$=d.c bias of applied voltage gives an output having harmonics whose Fourier amplitudes are then given by:

$$I_p = \frac{1}{2}\left(1+\cos\left(\frac{\pi V_b}{V_\pi}\right)J_o\left(\frac{\pi V_a}{V_\pi}\right)\right), p=0$$

$$\frac{1}{2}\cos\left(\frac{\pi V_b}{V_\pi}\right)J_p\left(\frac{\pi V_a}{V_\pi}\right), p \text{ even}, \neq 0$$

$$\frac{1}{2}\sin\left(\frac{\pi V_b}{V_\pi}\right)J_p\left(\frac{\pi V_a}{V_\pi}\right), p \text{ odd}$$

By selecting the bias voltage to be $\frac{1}{2}(V_\pi)$ we can generate even-only harmonics. By selecting the bias voltage to be $V_0$ we can select odd-only harmonics. Selecting $V_b$=0 reproduces the Mach-Zehnder transfer function in the zeroth harmonic as the bias voltage $V_b$ is tuned, and zero for the higher harmonics.

The d.c amplitude is equal to $|I_0|$. (ie the mean light power transmitted through the modulator)

The a.c amplitude is equal to $|2I_p|$, $p>1$.

Thus we can define the modulation depth for the "p'th" harmonic as:

$$M_p = \left| \frac{2I_p}{I_o} \right|$$

However the value of $I_0$ changes with applied a.c. modulation voltage $V_a$ (as well as with bias voltage $V_b$). Therefore, maximising the modulation depth does not necessarily correspond to maximising the amplitude of a particular harmonic.

It is perhaps more convenient to choose the d.c. level when $V_a=V_b=0$ as the reference, in which case $I_0$ ($V_a=V_b=0$)=1.

Then our modified modulation depth becomes:

$$M_p = \left| \frac{2I_p(V_a, V_b)}{I_o(V_a = V_b = 0)} \right|$$

$$= \cos\left(\frac{\pi V_b}{V_\pi}\right) J_p\left(\frac{\pi V_a}{V_\pi}\right), \begin{array}{l} p \text{ even} \\ p>1 \end{array}$$

$$\sin\left(\frac{\pi V_b}{V_\pi}\right) J_p\left(\frac{\pi V_a}{V_\pi}\right), \begin{array}{l} p \text{ odd} \\ p>1 \end{array}$$

FIGS. 3 to 6 show transfer characteristics calculated for various values of $V_a$ and $V_b$. Odd harmonics are biassed at ½$V_\pi$, even ones are biassed at V=0. In these figures the input voltage is shown as a dotted line and the output as a solid line. The voltages applied (arbitrary units) are given in the Table below:

| Occc cccc 1000 0000 10nn nnnn | | |
|---|---|---|
| Character | Sequence tag | Number |

In this way, by applying different amplitudes $V_a$ to electrical input, modulations of different frequencies can produced in the optical system.

As will be seen, the output wave form is not the same shape as the input. It can therefore be seen from these Figures that multiple-channel signals applied to such a modulator input would be distorted and thus difficult to extract at the receiver. However, for a single-frequency input such as a local oscillator this is not important as unwanted harmonics can be filtered out downstream.

In the simple case described with reference to FIGS. 3 to 6 the optical input is unmodulated, so that the optical output is modulated only by the multiplied control frequency. However, if the optical input signal already carries a modulation, the optical modulator will mix this modulation with the multiplied control frequency to provide an upconversion.

EXAMPLE

In the exemplary embodiment of FIG. 1, the signal source (4a) was embodied by an Avantek VTO 9090 oscillator generating channels between 950–1750 MHz. The output from this was used to modulate a Lasertron QLXS 1300 MW laser (1), whose output was directed along a step-index single mode 9/125 μm optical fibre (3) to a BT&D IOC 2000-1300 modulator (6). The control input (7) to this modulator was supplied by a Marconi 2042 local oscillator (4b) working at 3.4 GHz and amplified by a Minicircuits ZFL/42 amplifier (9) such that the eighth harmonic of the local oscillator frequency (ie 27.2 GHz) dominated the signal response. The output of modulator 6 thus had a RF carrier frequency of 27.2 GHz+(950 to 1750 MHz) or 28.15 to 28.95 GHz, which was fed through another step-index single mode 9/125 μm optical fibre 11 to a detector (12) such as described in Wake D: "A 1550 nm Millimeter—wave Photodetector with a Bandwidth Efficiency Product of 2.4 THz". (Journal of Lightwave Technology, 1992, Vol 10 pages 908–912). The output from this detector was amplified by a Celeritek CSA946892 amplifier (13) and transmitted from a standard gain 20 dBi horn antenna as a microwave transmission in the 28 GHz band.

While the embodiments described above have all included Mach-Zehnder interferometers, those skilled in the art will appreciate that the configuration of the interferometer is not significant; any type of interferometer which exhibits non-linear transmission characteristics such as electro-absorption modulators may be used instead. All that is required is that it should exhibit an appropriate transmission characteristic.

I claim:

1. A method of generating an optical signal having a first RF component including a first RF carrier frequency and an information component, the method comprising the steps of:

i) generating a first optical signal having a second RF component including a second RF carrier frequency different from said first RF carrier frequency;

ii) generating a control signal having a third non-zero RF component including a third RF carrier frequency different from said first RF carrier frequency;

said second or said third RF component including the information component;

iii) applying the first optical signal to an optical modulator; and iv) applying the control signal to the optical modulator to modulate the first optical signal so as to produce an output optical signal modulated by said first RF carrier frequency and said information component, said first carrier frequency being said second carrier frequency up-converted by said third carrier frequency or by an integer multiple of said third carrier frequency, wherein an amplitude of said control signal is controlled to control a desired harmonic output.

2. A method according to claim 1, wherein the first optical signal includes the information component.

3. A method according to claim 1, wherein the control signal includes the information component.

4. An electrical or radio signal having a first RF carrier frequency and an information component, generated by detecting an optical signal modulated by an RF component comprising a first RF carrier frequency and the information component, the optical signal being generated by the method of claim 1.

5. A method according to claim 1 wherein the control signal is an electrical signal.

6. A method according to claim 1 wherein the optical output of the modulator has a non-linear response to the control signal.

7. A method according to claim 6, wherein the amplitude of the control signal is selected such that the second RF carrier frequency is upconverted to the first RF carrier frequency by a frequency which is an integer multiple of the third RF frequency.

8. A method according to claim 7 wherein the first optical signal is generated by controlling the bias voltage of a laser.

9. A modulated optical signal having a first RF component including a first RF carrier frequency and an information component, when generated by the method of claim 1.

10. A method of generating an encrypted optical signal having a first RF component including a first RF carrier frequency and an information component, the method comprising the following steps:

i) generating a first optical signal having a second RF component including a second RF carrier frequency different from said first RF carrier frequency;

ii) generating a control signal having a third RF component including a third RF carrier frequency different from said first RF carrier frequency;

said second of said third RF component including the information component, iii) applying the first optical signal to an optical modulator and iv) applying the control signal to the optical modulator to modulate the first optical signal so as to produce an output optical signal modulated by said first RF carrier frequency and said information component, said first carrier frequency being said second carrier frequency up-converted by said third carrier frequency or by an integer multiple of said third carrier frequency, wherein both the input optical signal and the control signal include an information component, one of which is a predetermined encryption code.

11. A method of de-encrypting a signal according to claim 10 wherein said modulated output optical signal has a first RF component including a first RF carrier frequency and an information component and further comprising applying to the signal a further modulation complementary to that of the predetermined encryption code.

12. An apparatus for generating an optical signal having a first RF component, which includes a first RF carrier frequency and an information component, said apparatus comprising:

i) an optical modulator having an optical input, and optical output, and a control input;

ii) means for supplying to the optical input a modulated optical signal having a second RF component including a second RF carrier frequency different from said first RF carrier frequency;

iii) means for supplying to the control input a control signal having a third non-zero RF component including a third RF carrier frequency different from said first RF carrier frequency; and iv) means for applying a modulation comprising said information component to said optical signal or said control input;

the arrangement being such that there is produced at the optical output an optical signal modulated by said first RF carrier frequency and said information component, said first carrier frequency being said second carrier frequency up-converted by said third carrier frequency or by an integer multiple of said third carrier frequency, wherein an amplitude of said control signal is controlled to control a desired harmonic output.

13. Apparatus according to any of claim 12, wherein the means for supplying the modulated optical signal comprises a laser and means for controlling the bias voltage of the laser for generating the second RF component.

14. Apparatus according to claim 12 wherein the control input is an electrical input.

15. Apparatus according to claim 14, wherein the optical modulator is a Mach-Zehnder interferometer.

16. Apparatus according to claim 15, wherein the means for supplying the control signal is arranged to generate a signal such that the second RF component is upconverted by a frequency which is an integer multiple of the third RF component to generate the first RF component.

17. An encryption device for generating an encrypted optical signal having a first RF component, which includes a first RF carrier frequency and an information component, said device comprising i) an optical modulator having an optical input, an optical output, and a control input;

ii) means for supplying to the optical input a modulated optical signal having a second RF component including a second RF carrier frequency different from said first RF carrier frequency;

iii) means for supplying to the control input a control signal having a third RF component including a third RF carrier frequency different from said first RF carrier frequency, iv) means for applying a modulation comprising said information component to said optical signal or said control input;

the arrangement being such that there is produced at the optical output an optical signal modulated by said first RF carrier frequency and said information component, said first carrier frequency being said second carrier frequency up-converted by said third carrier frequency or by an integer multiple of said third carrier frequency; and means for applying modulation comprising information components to both the optical signal and the control signal, one of the information components being a predetermined encryption code.

18. A method of generating an output optical signal having an RF modulation, said method comprising:

applying an input optical signal to an optical input of a modulator having a non-linear transfer function; and applying a control signal having a control RF frequency to control input of the modulator;

the amplitude of the control signal being controlled to control a desired harmonic output such that the output optical signal is modulated by an RF frequency which is an integer multiple of the control RF frequency.

19. A method according to claim 18, wherein the modulator is a Mach-Zehnder interferometer.

20. A method according to claim 18, wherein the input optical signal carries an initial RF modulation, the output optical signal comprising an RF modulation which is the initial RF modulation upconverted by an integer multiple of the control RF frequency.

21. A method of generating an electrical or radio signal having a first RF component including a first RF carrier frequency and an information component, the method comprising the following steps:

i) generating a first optical signal having a second RF component including a second, non-zero, RF carrier frequency different from said first RF carrier frequency;

ii) generating a control signal having a third RF component including a third, non-zero, RF carrier frequency different from said first RF carrier frequency;

said second or third RF component including the information component;

iii) applying the first optical signal to an optical modulator;

iv) applying the control signal to the optical modulator to modulate the first optical signal so as to produce an output optical signal modulated by said first RF carrier frequency and said information component, said first carrier frequency being said second carrier frequency up-converted by said third carrier frequency or by an integer multiple of said third carrier frequency, wherein an amplitude of said control signal is controlled to control a desired harmonic output; and v) extracting from said optical signal the first RF component having said first carrier frequency and information component.

22. An apparatus for generating an electrical or radio signal having a first RF component, which includes a first RF carrier frequency and in information component, said apparatus comprising:

i) an optical modulator having an optical input, an optical output, and a control input;

ii) means for supplying to the optical input a modulated optical signal having a second RF component including a second, non-zero, RF carrier frequency different from said first RF carrier frequency;

iii) means for supplying to the control input a control signal having a third, non-zero, RF component including a third RF carrier frequency different from said first RF frequency;

iv) means for applying a modulation comprising said information component to said optical signal or said control input;

v) means for transmitting the optical signal to a detection means; and vi) the detection means being arranged to extract from the optical signal an RF component including said first carrier frequency and information component;

the arrangement being such that the detection means extracts a signal modulated by said first RF carrier frequency and said information component, said first carrier frequency being said second carrier frequency up-converted by said third carrier frequency or by an integer multiple of said third carrier frequency, wherein an amplitude of said control signal is controlled to control a desired harmonic output.

23. A method for generating an up-converted modulated RF carrier on an optical carrier signal, said method comprising the steps of:

applying a first RF sub-carrier-modulated optical input at a first non-zero sub-carrier radio frequency to an optical modulator;

applying a second RF sub-carrier electrical input at a second non-zero sub-carrier radio frequency to said optical modulator;

at least one of said first and second RF sub-carriers having been modulated to carry data therewith; and providing an optical carrier output signal from said optical modulator including an upconverted data-modulated third RF carrier frequency higher than either said first and second sub-carrier RF frequencies.

24. A method as in claim 23 wherein said optical modulator has a periodic transfer function and said upconverted third RF frequency includes a component having a frequency equal to said second RF frequency multiplied by an integer greater than two as determined by the amplitude of said electrical input.

25. Apparatus for generating an upconverted data-modulated RF carrier on an optical carrier signal, said apparatus comprising:

an optical signal source providing a first RF sub-carrier-modulated optical signal at a first non-zero sub-carrier radio frequency;

an electrical signal source providing a second RF sub-carrier electrical signal at a second non-zero sub-carrier radio frequency;

an information signal modulator connected to modulate at least one of said first and second RF sub-carriers with data;

an electro-optical signal modulator having an optical input connected to receive said first RF sub-carrier-modulated optical signal, having an electrical control input connected to receive said second RF sub-carrier electrical signal, and having an optical output providing an upconverted data-modulated RF carrier at a third RF carrier frequency higher than either of said first and second RF sub-carrier frequencies.

26. Apparatus as in claim 25 wherein said modulator has a periodic transfer function and further comprising:

means for controlling the amplitude of said second RF sub-carrier electrical signal to thereby cause the upconverted RF frequency to include a component having a frequency equal to said second RF sub-carrier frequency multiplied by an integer greater than two.

* * * * *